United States Patent
Du et al.

(10) Patent No.: US 10,979,428 B2
(45) Date of Patent: Apr. 13, 2021

(54) AUTONOMIC CONTROL PLANE PACKET TRANSMISSION METHOD, APPARATUS, AND SYSTEM

(71) Applicant: HUAWEI TECHNOLOGIES CO., LTD., Shenzhen (CN)

(72) Inventors: Zongpeng Du, Beijing (CN); Sheng Jiang, Beijing (CN); Bing Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 15/872,990

(22) Filed: Jan. 17, 2018

(65) Prior Publication Data
US 2018/0145981 A1 May 24, 2018

Related U.S. Application Data

(63) Continuation of application No. PCT/CN2015/084384, filed on Jul. 17, 2015.

(51) Int. Cl.
*H04L 29/06* (2006.01)
*H04L 29/08* (2006.01)

(52) U.S. Cl.
CPC .......... *H04L 63/0876* (2013.01); *H04L 29/06* (2013.01); *H04L 63/126* (2013.01);
(Continued)

(58) Field of Classification Search
CPC ... H04L 63/0876; H04L 69/22; H04L 63/162; H04L 63/126; H04L 63/0428; H04L 67/12; H04L 67/104; H04L 29/06
(Continued)

(56) References Cited

U.S. PATENT DOCUMENTS

2006/0136715 A1* 6/2006 Han ............... H04L 9/3242
713/151
2008/0075073 A1* 3/2008 Swartz ............ H04L 63/162
370/389
(Continued)

FOREIGN PATENT DOCUMENTS

CN 101141241 A 3/2008
CN 101193064 A 6/2008
(Continued)

OTHER PUBLICATIONS

IEEE Std 802.1AR, IEEE Standard for Local and metropolitan area networks—Secure Device Identity, IEEE computer society, Sponsored by the LAN/MAN Standards Committee, Dec. 22, 2009, 77 pages.
(Continued)

*Primary Examiner* — Aravind K Moorthy
(74) *Attorney, Agent, or Firm* — Kilpatrick Townsend & Stockton LLP

(57) ABSTRACT

A method includes: setting up, by a first network device, a MACSec channel to a second network device according to the MACSec protocol; and sending, by the first network device, an ACP packet to the second network device by using the MACSec channel, where the ACP packet is carried in a MACSec frame, and a frame header of the MACSec frame carries identification information used to identify the ACP packet. By means of the packet transmission method, a MACSec channel is set up between adjacent nodes in a self-organizing network according to the MACSec protocol, and an ACP packet is transmitted between the adjacent nodes by using the MACSec channel and processed.

9 Claims, 5 Drawing Sheets

100

A first network device sets up, according to the Media Access Control Security MACSec protocol, a MACSec channel to a second network device — S110

The first network device sends an autonomic control plane ACP packet to the second network device by using the MACSec channel, where the ACP packet is carried in a MACSec frame, and a frame header of the MACSec frame carries identification information used to identify the ACP packet — S120

(52) U.S. Cl.
CPC .......... *H04L 63/162* (2013.01); *H04L 67/104* (2013.01); *H04L 67/12* (2013.01); *H04L 69/22* (2013.01); *H04L 63/0428* (2013.01)

(58) Field of Classification Search
USPC .......................................................... 726/4
See application file for complete search history.

(56) References Cited

U.S. PATENT DOCUMENTS

| | | | |
|---|---|---|---|
| 2008/0123652 A1* | 5/2008 | Akyol ................ H04L 12/4633 | 370/392 |
| 2008/0141023 A1* | 6/2008 | Qi ...................... H04L 63/0428 | 713/155 |
| 2008/0162922 A1* | 7/2008 | Swartz ................ H04L 63/162 | 713/150 |
| 2009/0199268 A1 | 8/2009 | Ahmavaara et al. | |
| 2009/0217032 A1* | 8/2009 | Guan .................. H04L 63/123 | 713/154 |
| 2009/0276830 A1* | 11/2009 | O'Connor .......... H04L 63/0428 | 726/3 |
| 2009/0307751 A1* | 12/2009 | Lin ...................... H04L 63/101 | 726/3 |
| 2009/0327695 A1* | 12/2009 | Molsberry .......... H04L 63/0428 | 713/151 |
| 2010/0049964 A1* | 2/2010 | Kondapalli ............ H04L 69/28 | 713/150 |
| 2010/0153550 A1* | 6/2010 | Diab .................... H04L 63/162 | 709/225 |
| 2010/0174901 A1* | 7/2010 | Khermosh ........... H04L 63/162 | 713/160 |
| 2010/0260201 A1 | 10/2010 | Yu et al. | |
| 2010/0312910 A1* | 12/2010 | Lin ............................ H04L 9/06 | 709/238 |
| 2011/0087878 A1* | 4/2011 | Weis .................... H04L 63/102 | 713/151 |
| 2011/0252231 A1* | 10/2011 | Mishra .................. H04L 9/0891 | 713/160 |
| 2012/0314717 A1 | 12/2012 | Nakamura | |
| 2013/0091349 A1* | 4/2013 | Chopra ................ H04L 12/462 | 713/150 |
| 2013/0114601 A1* | 5/2013 | Branscomb ............. H04L 45/00 | 370/392 |
| 2013/0117856 A1* | 5/2013 | Branscomb ......... H04L 63/0428 | 726/26 |
| 2013/0195119 A1* | 8/2013 | Huang ................ H04L 65/4092 | 370/468 |
| 2013/0318570 A1* | 11/2013 | L. ............................. H04L 63/20 | 726/4 |
| 2014/0079063 A1* | 3/2014 | Edsall ................... H04L 49/253 | 370/392 |
| 2014/0192808 A1 | 7/2014 | Thubert et al. | |
| 2014/0201516 A1* | 7/2014 | Bjarnason ........... H04L 41/0806 | 713/150 |
| 2014/0215580 A1* | 7/2014 | Behringer ............. H04L 63/105 | 726/5 |
| 2015/0030029 A1* | 1/2015 | Mohamed ............... H04L 63/08 | 370/392 |
| 2015/0117471 A1* | 4/2015 | Mizrahi ................ H04J 3/0667 | 370/512 |
| 2015/0139251 A1* | 5/2015 | Tzeng .................. H04J 3/0661 | 370/503 |
| 2015/0207793 A1* | 7/2015 | Mohamed ............... H04L 41/12 | 726/6 |
| 2015/0281130 A1* | 10/2015 | Lembcke .............. H04L 49/351 | 370/276 |
| 2015/0365409 A1* | 12/2015 | Mohamed ........... H04L 63/0272 | 713/170 |
| 2016/0036813 A1* | 2/2016 | Wakumoto .......... H04L 63/0272 | 713/171 |
| 2016/0043996 A1* | 2/2016 | Syed Mohamed ..... H04L 63/20 | 726/1 |
| 2016/0164832 A1* | 6/2016 | Bellagamba ........... H04L 67/10 | 726/12 |
| 2016/0308765 A1* | 10/2016 | Le ........................... H04L 69/22 | |
| 2016/0315853 A1* | 10/2016 | Liste ....................... H04L 45/38 | |
| 2016/0371750 A1* | 12/2016 | Peddinti ............. G06Q 30/0277 | |

FOREIGN PATENT DOCUMENTS

| | | |
|---|---|---|
| CN | 101939968 A | 1/2011 |
| CN | 102820940 A | 12/2012 |
| CN | 104205764 A | 12/2014 |
| WO | 2014113301 A1 | 7/2014 |

OTHER PUBLICATIONS

S. Cheshire et al, "Dynamic Configuration of IPv4 Link-Local Addresses", Network Working Group, rfc3927, Category: Standards Track, May 2005, 33 pages.

IEEE Std 802.1AE™-2006 IEEE Standard for Local and metropolitan area networks—Media Access Control (MAC) Security, IEEE Computer Society Sponsored by the LAN/MAN Standards Committee, Aug. 18, 2006, 154 pages.

IEEE Std 802.1X™-2010 IEEE Standard for Local and metropolitan area networks—Port-Based Network Access Control, IEEE Computer Society Sponsored by the LAN/MAN Standards Committee, Feb. 5, 2010, 222 pages.

* cited by examiner

| MAC Header (MAC header) | 802.1AE Header (802.1AE header) | 802.1Q VLAN | Type/Length (type/length) | IP Header (IP header) | TCP/UDP | Higher Layer Protocol (higher layer protocol) | 802.1AE ICV | CRC |

FIG. 2

| CRC 2 3 MACSec Ethertype (MACSec Ethernet type) | TCI | AN | SL | PN | SCI |

FIG. 3

AUTONOMIC CONTROL PLANE PACKET TRANSMISSION METHOD, APPARATUS, AND SYSTEM

CROSS-REFERENCE TO RELATED APPLICATIONS

This application is a continuation of International Application No. PCT/CN2015/084384, filed on Jul. 17, 2015, the disclosure of which is hereby incorporated by reference in its entirety.

TECHNICAL FIELD

The application relates to the field of information technologies, and in particular, to a packet transmission method, apparatus, and system.

BACKGROUND

A self-organizing network supports self-management, so as to reduce intervention of an administrator and improve automation of the network, thereby alleviating network management workload, facilitating deployment of new services, lowering a probability of a configuration error, and reducing an operating expense (OPEX).

In an important aspect of the self-organizing network, a device can be "plug-and-play", and supports bootup and self-configuration. One of key technologies of the self-organizing network is setup of an autonomic control plane (ACP). The ACP is characterized in that participation of an administrator is not required, and such a control plane is automatically generated and automatically grows up (a new device automatically joins). Setup of an end-to-end connection is completely "zero-touch (zero-touch)", and the ACP is not affected by incorrect configuration of an administrator, so as to implement secure information exchange.

In an existing solution, setup of an ACP relies on IPv6, but most devices in an existing network support IPv4. Development of an IPv4-based ACP provides a better compatibility with the existing network and can reduce deployment barriers. If a secure tunnel is to be set up by using a link-local address similar to an IPv6 link-local address (link-local-IP) (169.254.0.0/16), when an ACP having an IPSec channel is set up based on IPv4, an IPv4 link-local address needs to be used. However, different from IPv6, Request For Comments RFC (Request For Comments) 3927 recommends that an IPv4 link-local address is used only when there is no routable IPv4 interface address. Consequently, usually, no layer 3 tunnel corresponding to the IPv6 link-local-IP can be used in this case, and an IPv4-based ACP having an IPSec channel cannot be set up.

SUMMARY

The application provides a packet transmission method, apparatus, and system, so as to improve efficiency.

According to a first aspect, a packet transmission method is provided and is applied to a self-organizing network. The method includes: setting up, by a first network device according to the Media Access Control Security MACSec protocol, a MACSec channel to a second network device; and sending, by the first network device, an autonomic control plane ACP packet to the second network device by using the MACSec channel, where the ACP packet is carried in a MACSec frame, and a frame header of the MACSec frame carries identification information used to identify the ACP packet.

With reference to the first aspect, in an implementation of the first aspect, the identification information is carried in an Ethernet type field in the frame header of the MACSec frame, and the Ethernet type field is used to indicate that the MACSec frame is used to carry the ACP packet.

With reference to the first aspect or the foregoing implementation of the first aspect, in another implementation of the first aspect, the identification information is carried in a flag bit field in the frame header of the MACSec frame, and the flag bit field is a newly added field or a version field.

With reference to the first aspect or the foregoing implementation of the first aspect, in another implementation of the first aspect, the identification information is carried in a MAC address field in the frame header of the MACSec frame.

According to a second aspect, a packet transmission method is provided and is applied to a self-organizing network. The method includes: setting up, by a second network device according to the Media Access Control Security MACSec protocol, a MACSec channel to a first network device; receiving, by the second network device by using the MACSec channel, a MACSec frame sent by the first network device; and determining, by the second network device according to identification information that is carried in a frame header of the MACSec frame and that is used to identify an autonomic control plane ACP packet, the ACP packet.

With reference to the second aspect, in an implementation of the second aspect, the identification information is carried in an Ethernet type field in the frame header of the MACSec frame, and the Ethernet type field is used to indicate that the MACSec frame is used to carry the ACP packet.

With reference to the second aspect or the foregoing implementation of the second aspect, in another implementation of the second aspect, the identification information is carried in a flag bit field in the frame header of the MACSec frame, and the flag bit field is a newly added field or a version field.

With reference to the second aspect or the foregoing implementation of the second aspect, in another implementation of the second aspect, the identification information is carried in a MAC address field in the frame header of the MACSec frame.

According to a third aspect, a first network device for packet transmission is provided and is applied to a self-organizing network. The first network device includes: a setup module, configured to set up, by the first network device according to the Media Access Control Security MACSec protocol, a MACSec channel to a second network device; and a sending module, configured to send, by the first network device, an autonomic control plane ACP packet to the second network device by using the MACSec channel that is set up by the setup module, where the ACP packet is carried in a MACSec frame, and a frame header of the MACSec frame carries identification information used to identify the ACP packet.

With reference to the third aspect, in an implementation of the third aspect, the identification information is carried in an Ethernet type field in the frame header of the MACSec frame, and the Ethernet type field is used to indicate that the MACSec frame is used to carry the ACP packet.

With reference to the third aspect or the foregoing implementation of the third aspect, in another implementation of the third aspect, the identification information is carried in a flag bit field in the frame header of the MACSec frame, and the flag bit field is a newly added field or a version field.

With reference to the third aspect or the foregoing implementation of the third aspect, in another implementation of the third aspect, the identification information is carried in a MAC address field in the frame header of the MACSec frame.

According to a fourth aspect, a second network device for packet transmission is provided and is applied to a self-organizing network. The second network device includes: a setup module, configured to set up, by the second network device according to the Media Access Control Security MACSec protocol, a MACSec channel to a first network device; a receiving module, configured to receive, by the second network device by using the MACSec channel that is set up by the setup module, a MACSec frame sent by the first network device; and a determining module, configured to determine, by the second network device according to identification information that is carried in a frame header of the MACSec frame received by the receiving module and that is used to identify an autonomic control plane ACP packet, the ACP packet.

With reference to the fourth aspect, in an implementation of the fourth aspect, the identification information is carried in an Ethernet type field in the frame header of the MACSec frame, and the Ethernet type field is used to indicate that the MACSec frame is used to carry the ACP packet.

With reference to the fourth aspect or the foregoing implementation of the fourth aspect, in another implementation of the fourth aspect, the identification information is carried in a flag bit field in the frame header of the MACSec frame, and the flag bit field is a newly added field or a version field.

With reference to the fourth aspect or the foregoing implementation of the fourth aspect, in another implementation of the fourth aspect, the identification information is carried in a MAC address field in the frame header of the MACSec frame.

According to a fifth aspect, a packet transmission system is provided and is applied to a self-organizing network. The system includes: the foregoing first network device and the foregoing second network device. The first network device sets up, according to the Media Access Control Security MACSec protocol, a MACSec channel to the second network device; the first network device sends an autonomic control plane ACP packet to the second network device by using the MACSec channel, where the ACP packet is carried in a MACSec frame, and a frame header of the MACSec frame carries identification information used to identify the ACP packet; the second network device receives the MACSec frame; and the second network device determines, according to the identification information that is carried in the frame header of the MACSec frame and that is used to identify the autonomic control plane ACP packet, the ACP packet.

Based on the foregoing technical solutions, by means of the packet transmission method, apparatus, and system in the embodiments of the application, the MACSec channel is set up between the first network device and the second network device that are in the self-organizing network according to the MACSec protocol, and the MACSec frame can be transmitted between the first network device and the second network device by using the MACSec channel. The frame header of the MACSec frame carries the identification information, and the ACP packet can be indicated according to the identification information. Therefore, a routable interface address and a link-local address that is used to set up an IPSec do not need to be both configured on an interface, and a MACSec security mechanism is provided for an ACP according to the MACSec protocol and without using an L3 tunnel, thereby improving efficiency. In addition, the ACP packet in the MACSec frame can be distinguished by using the identification information, so that the ACP packet can be transmitted between the first network device and the second network device that are in the self-organizing network.

BRIEF DESCRIPTION OF DRAWINGS

To describe the technical solutions in the embodiments of the application more clearly, the following briefly describes the accompanying drawings required for describing the embodiments of the application. Apparently, the accompanying drawings in the following description show merely some embodiments of the application, and a person of ordinary skill in the art may still derive other drawings from these accompanying drawings without creative efforts.

FIG. 2 is a schematic structural diagram of a MACSec frame in a packet transmission method according to an embodiment of the application;

FIG. 3 is a schematic structural diagram of another MACSec frame in a packet transmission method according to an embodiment of the application;

DESCRIPTION OF EMBODIMENTS

The following clearly and describes the technical solutions in the embodiments of the application with reference to the accompanying drawings in the embodiments of the application. Apparently, the described embodiments are a part rather than all of the embodiments of the application. All other embodiments obtained by a person of ordinary skill in the art based on the embodiments of the application without creative efforts shall fall within the protection scope of the application.

Figure 1:
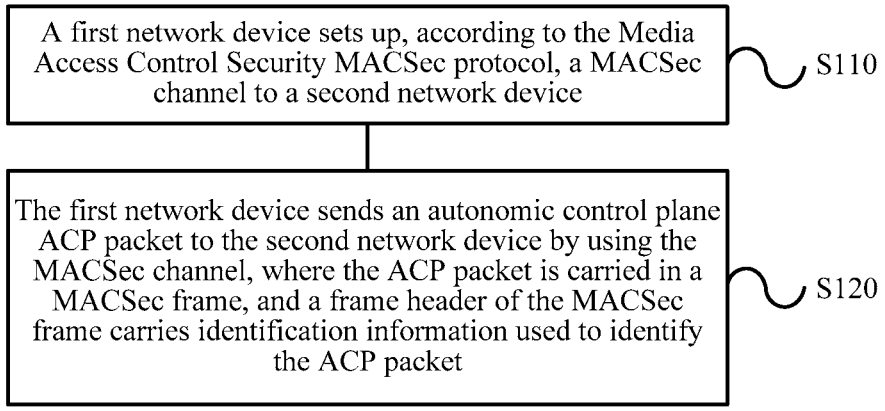
FIG. 1 is a schematic flowchart of a packet transmission method according to an embodiment of the application.

FIG. 1 is a schematic flowchart of a packet transmission method 100 according to an embodiment of the application. The method 100 may be applied to a self-organizing network and is performed by a first network device in the self-organizing network. The first network device may be a transmit node. As shown in FIG. 1, the method 100 includes the following steps.

S110: The first network device sets up, according to the Media Access Control Security MACSec protocol, a MACSec channel to a second network device.

S120: The first network device sends an autonomic control plane ACP packet to the second network device by using the MACSec channel, where the ACP packet is carried in a MACSec frame, and a frame header of the MACSec frame carries identification information used to identify the ACP packet.

Specifically, in the self-organizing network, a node may be set to a registrar (Registrar) node. A unique device identifier (UDI) whitelist of self-organizing nodes is configured for the registrar node. Nodes in the UDI whitelist may join in the self-organizing domain, and the registrar node is connected to a domain CA (a self-organizing domain digital certificate authentication authority) and supports domain certificate (domain certificate) allocation. Each node in the network initiates an adjacency discovery (AD) message, and searches for a neighboring node by using the AD message. The AD message includes a UDI or a domain certificate. Each node may create a neighbor list according to the AD message. After receiving the AD message, the registrar node compares the UDI with the UDI whitelist, and sends the domain certificate to the neighboring node belonging to the UDI whitelist. The neighboring node and the registrar node perform, based on the domain certificate, mutual authentication, obtain, after the authentication succeeds, a packet encryption key by means of negotiation based on a key generated in an authentication process, and set up a MACSec channel between the registrar node and the neighboring node according to the Media Access Control Security MACSec) protocol. Similarly, for a neighboring node of the neighboring node of the registrar node, the neighboring node of the registrar node needs to serve as a proxy server (Proxy) and an authenticator, and other steps are the same, thereby setting up MACSec channels between adjacent nodes in the self-organizing network, so that multiple nodes belonging to a same domain form an ACP. In the ACP, the nodes may mutually transmit, by using the MACSec channels, ACP packets encapsulated according to the MACSec protocol.

Therefore, by means of the packet transmission method in this embodiment of the application, the MACSec channel is set up between the first network device and the second network device that are in the self-organizing network according to the MACSec protocol. The first network device sends the ACP packet to the second network device by using the MACSec channel. The ACP packet is carried in the MACSec frame, and the frame header of the MACSec frame carries the identification information used to identify the ACP packet. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

In this embodiment of the application, each node in the self-organizing network supports a self-organizing feature, and each node has a UDI or a device ID certificate (DevID certificate) of the node. Optionally, an example in which each node obtains a domain certificate by using the UDI is used herein for description, but the application is not limited thereto. In the network, a node is set to a registrar (Registrar) node. The registrar node supports domain certificate allocation and a UDI whitelist of self-organizing nodes is configured for the registrar node. Nodes in the UDI whitelist belong to a same self-organizing domain. Optionally, the registrar node may be pre-configured. The registrar node is a node that can support domain certificate allocation, that is, the registrar node is connected to a digital certificate authentication management authority and can communicate with the digital certificate authentication management authority. That is, the registrar node can allocate the domain certificate to another node by using the digital certificate authentication management authority.

In this embodiment of the application, after the self-organizing feature is enabled, the self-organizing node can send an AD message to a neighboring node, so as to search for the neighboring node of the self-organizing node. Optionally, each node may initiate the AD message once at a time interval, for example, every 10 s. The AD message may include a UDI or a domain certificate. For example, for an AD message sent by the registrar node, the registrar node supports the domain certificate allocation and may first allocate a domain certificate to the registrar node. The AD message sent by the registrar node may include the domain certificate. For an AD message sent by a node having no domain certificate, the AD message may include a UDI.

In this embodiment of the application, the AD message sent by the self-organizing node can merely be sent for a distance of one hop. That is, only the neighboring node can receive the AD message. Therefore, after receiving an AD message sent by a neighboring node, a node may set up a neighbor list for recording the neighboring node of the node. Optionally, the neighbor list may include a UDI of the neighboring node. The UDI is obtained by using the AD message sent by the neighboring node. The neighbor list may further include address information. The address information may be an IPv6 address, an IPv4 address, or a Media Access Control (MAC) address, and may be determined by using a packet in the sent AD message, but the application is not limited thereto. A UDI and address information of a neighboring node of each node can be determined according to a neighboring node list determined by the node.

In this embodiment of the application, after receiving the AD message sent by the neighboring node, the registrar node compares a UDI in the AD message with the UDI whitelist of the registrar node. If the UDI of the neighboring node matches the UDI whitelist, the registrar node generates a domain certificate according to the UDI, and sends the domain certificate to the neighboring node. The domain certificate is used in a subsequent AD broadcast. In this case, the registrar node and the neighboring node that have the domain certificate belong to a same ACP.

In this embodiment of the application, the AD message that is received by the registrar node and that is sent by the neighboring node may be an AD message of the neighboring node, or may be an AD message that is of the neighboring node of the neighboring node and that is forwarded by the neighboring node. In addition, in comparison with the UDI whitelist, and for nodes belonging to a same domain, the registrar node sends the domain certificate to all the nodes. Optionally, the domain certificate may be mutually forwarded by the neighboring nodes. Nodes having the domain certificate all belong to a same domain, and the nodes in the self-organizing network belong to a same ACP.

In this embodiment of the application, when each node in the self-organizing network has an DevID certificate of the node, an AD message sent by the node to a neighboring node includes the domain certificate or a secured Unique Device Identifier (SUDI). An AD message of the registrar node may include the domain certificate, and an AD message of a node having no domain certificate includes an SUDI. The neighboring node sends an 802.1AR certificate of the neighboring node to the registrar node. Optionally, the neighboring node may send an 802.1AR certificate of the neighboring node to the registrar node by using a Proxy. The registrar node receiving the message verifies the certificate by using a public key, and is connected to a verification server to verify whether the device can access the domain. If verification succeeds, the registrar node generates a domain certificate according to the SUDI and sends the domain certificate to the corresponding neighboring node. The neighboring node receives the domain certificate and uses the domain certificate in the subsequent AD broadcast. Similarly, the neighboring node of the neighboring node of the registrar node may also obtain the domain certificate by using the method. The registrar node and the neighboring node that have the domain certificate belong to a same ACP.

In S110, the first network device and the second network device that are in the self-organizing network may set up the MACSec channel according to the Media Access Control Security MACSec protocol. The first network device and the second network device may be any two nodes in the self-organizing network. Optionally, the first network device and the second network device may be two neighboring nodes. Specifically, the neighboring node obtaining the domain certificate and the registrar node may perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for the neighboring node of the neighboring node of the registrar node, the neighboring node of the registrar node may serve as a proxy server (Proxy) and an authenticator, and other steps are the same, thereby setting up MACSec channels between adjacent nodes of nodes belonging to a same domain. In this way, packet transmission can be performed between any two nodes, that is, the first network device and the second network device, in the ACP by using the MACSec channel.

Specifically, the neighboring node obtaining the domain certificate sent by the registrar node may initiate authentication to the registrar node, for example, may initiate 802.1X-based authentication. The registrar node may serve as an authenticator (Authenticator) and an authentication server, to implement the mutual authentication between the registrar node and the neighboring node. For example, an EAP-TLS (Extensible Authentication Protocol, Extensible Authentication Protocol) (Transport Layer Security Protocol, Transport Layer Security Protocol) authentication method may be selected, to comply with the 802.1af standard.

In this embodiment of the application, after the authentication succeeds, the registrar node and the neighboring node obtain the packet encryption key by means of the negotiation based on the key generated in the authentication process, and set up an ACP-dedicated secure MACSec channel. Specifically, a pairwise master key (PMK) generated in the previous authentication between the registrar node and the neighboring node is used as a connectivity association key (CAK) according to the MACSec Key Agreement (MKA). Serving as an authenticator, the registrar node is selected as a key server (key server) in the MKA protocol by default, and may generate a secure association key (SAK) according to the 802.1X protocol and according to the CAK, a random number, or the like, encrypt the SAK, and send the encrypted SAK to the neighboring node, so as to facilitate use of the SAK for encryption and signature of an Ethernet frame in subsequent communication.

In this embodiment of the application, after the registrar node and the neighboring node set up the MACSec channel by using the foregoing method, and when the neighboring node of the neighboring node of the registrar node joins in the ACP, the neighboring node of the registrar node may serve as a proxy server (Proxy) and an authenticator, and the neighboring node of the neighboring node of the registrar node obtains the domain certificate by using the same method, further joins in the ACP, and sets up a MACSec channel between the neighboring node of the neighboring node and the neighboring node by means of authentication.

In S120, in the ACP in the self-organizing network, the first network device may send the ACP packet to the second network device by using the MACSec channel that is set up. Specifically, any node in the self-organizing network may send an ACP packet to a neighboring node by using a MACSec channel. The ACP packet is forwarded at least once. The ACP packet can be transmitted between any two nodes, that is, the first network device and the second network device, in the self-organizing network. Another packet can be transmitted by using the MACSec channel at a MAC layer. Therefore, specifically, the identification information may be carried in the frame header of the MACSec frame, and it may be distinguished according to the identification information whether the MACSec frame carries the ACP packet. Optionally, the ACP packet and the another packet of packets encapsulated according to the MACSec protocol may be determined by using the following several methods.

Optionally, in an embodiment, an example in which a packet is transmitted between neighboring nodes is used. When a node sends, to a neighboring node, a MACSec frame encapsulated according to the MACSec protocol, a frame header of the MACSec frame may carry identification information, and the identification information is used to indicate that a structure of the frame is used to carry an ACP packet. Specifically, if the entire self-organizing network does not use the MACSec on a data plane, a packet encapsulated according to the MACSec protocol is an ACP packet, and another packet may be encapsulated by means of MAC. After being decapsulated, the packet is processed by means of global routing. For example, when the entire self-organizing network does not use the MACSec on the data plane, a packet that is sent by the node to the neighboring node and that is encapsulated in an 802.1ae format is a packet encapsulated according to the MACSec protocol. The packet may be understood as the ACP packet. Specifically, as shown in FIG. 2, FIG. 2 shows a MACSec frame encapsulated in the 802.1ae format. A frame header of the MACSec frame may include several fields shown in FIG. 2. The 802.1AE header (802.1AE Header) field may be the identification information and indicates that a structure of the frame is a packet encapsulated according to the MACSec protocol, and the MACSec frame is used to carry an ACP packet. On the contrary, if the 802.1AE header is not included, it may be determined that a structure of the frame is another common packet.

Optionally, in an embodiment, an example in which a packet is transmitted between neighboring nodes is used. When a node sends, to a neighboring node, a MACSec frame encapsulated according to the MACSec protocol, a frame header of the MACSec frame may carry identification information, and the identification information is used to indicate that a structure of the frame is used to carry an ACP packet. For example, the identification information may be carried in an Ethernet type field in the frame header of the transmitted MACSec frame. Specifically, the transmitted packet may include the Ethernet type (Ethertype) field. For example, as shown in FIG. 2, the Ethernet type field may be located in an 802.1AE header field. Specifically, as shown in FIG. 3, the 802.1AE header field may include a MACSec Ethertype field, a TCI (TAG control information, tag control information) field, an AN (Association Number) field, an SL (Short Length) field, a PN (Packet Number) field, and an SCI (Secure Channel Identifier, secure channel identifier) field. The MACSec Ethertype field may include two octets. One octet may include 8 bits. The TCI field and the AN field may include one octet in total, the SL field may include one octet, the PN field may include four octets, and the SCI field may include eight octets, but the application is not limited thereto. In the 802.1AE Header field, for the MACSec Ethertype field, that is, the Ethernet type field carrying the identification information, optionally, the MACSec Ethertype field may include the identification information, or may be directly used as the identification information. Optionally, if the field is used as the identification information, it may be set that when a value of the MACSec Ethertype field is a preset value, the packet is an ACP packet; or when a value of the MACSec Ethertype field is not the preset value, the packet is another packet. For example, in the packet encapsulated in the 802.1ae format, a value of the MACSec Ethertype field may be represented by 88e5, and the packet is a common packet. A new value of the MACSec Ethertype field, for example, 88e6, is set to the preset value, and the packet is an ACP packet.

Figure 4:
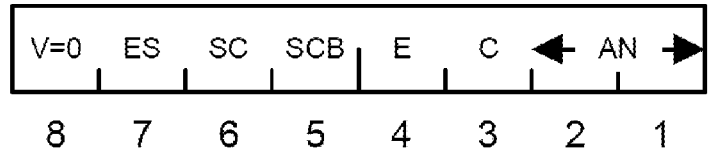
FIG. 4 is a schematic structural diagram of still another MACSec frame in a packet transmission method according to an embodiment of the application.

Optionally, in an embodiment, an example in which a packet is transmitted between neighboring nodes is used. When a node sends, to a neighboring node, a MACSec frame encapsulated according to the MACSec protocol, a frame header of the MACSec frame may include identification information used to distinguish an ACP packet. For example, the identification information may be carried in a flag bit field in the frame header of the transmitted MACSec frame, and the flag bit field may be a newly added field or may be an existing field. Specifically, the flag bit field may be an original indicator bit in the packet. For example, in the packet encapsulated in the 802.1ae format, the TCI field and the AN field that are shown in FIG. 3 occupy one octet, that is, the two fields occupy eight bits in total. The two fields may be expanded as shown in FIG. 4. v=0 in the eighth bit indicates a version (version) bit, and the version bit is originally used to indicate a version of the MACSec and is 0 at present. In this embodiment of the application, the version bit may be used to indicate the ACP packet. When the bit is "1", it indicates that the packet is an ACP packet; or when the bit is "0", it indicates that the packet is another packet. Optionally, a new flag bit may be added to the transmitted packet. The flag bit includes the identification information of the ACP packet. For example, when the flag bit is "0", it indicates that the packet is an ACP packet; or when the flag bit is "1", it indicates that the packet is another packet.

Optionally, in an embodiment, an example in which a packet is transmitted between neighboring nodes is used. When a node sends, to a neighboring node, a MACSec frame encapsulated according to the MACSec protocol, a frame header of the MACSec frame may include identification information that is of an ACP packet and that is used to indicate that the packet is an ACP packet. For example, the identification information may be carried in a MAC address field in the transmitted packet, and it is determined according to the MAC address field whether the transmitted packet is an ACP packet. For example, for eight most significant bits of an existing MAC address, a second bit b2 of the eight bits is used to distinguish whether the MAC address is a locally managed MAC address or a global (global) MAC address. Most existing MAC addresses are global. Therefore, the bit b2 may be used as the identification information and is used to indicate whether the packet is an ACP packet. In this case, the locally managed MAC address (virtual MAC) and the global MAC address are both used on a device interface. When the locally managed MAC address is used to transmit the packet, that is, when a value of b2 is 1, the transmitted packet is an ACP packet. When the global MAC address is used to transmit the packet, that is, when a value of b2 is 0, the transmitted packet is another packet, but the application is not limited thereto. Optionally, the identification information of the ACP packet may be carried in another location in the MAC address field. Alternatively, one or more bits may be newly added to the MAC address field to carry the identification information.

In this embodiment of the application, by using the foregoing method, each node in the ACP may generate and send, to a neighboring node, an ACP packet encapsulated according to the MACSec protocol.

Therefore, by means of the packet transmission method in this embodiment of the application, the MACSec channel is set up between the first network device and the second network device that are in the self-organizing network according to the MACSec protocol. The first network device sends the ACP packet to the second network device by using the MACSec channel. The ACP packet is carried in the MACSec frame, and the frame header of the MACSec frame carries the identification information used to identify the ACP packet. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

Figure 5:
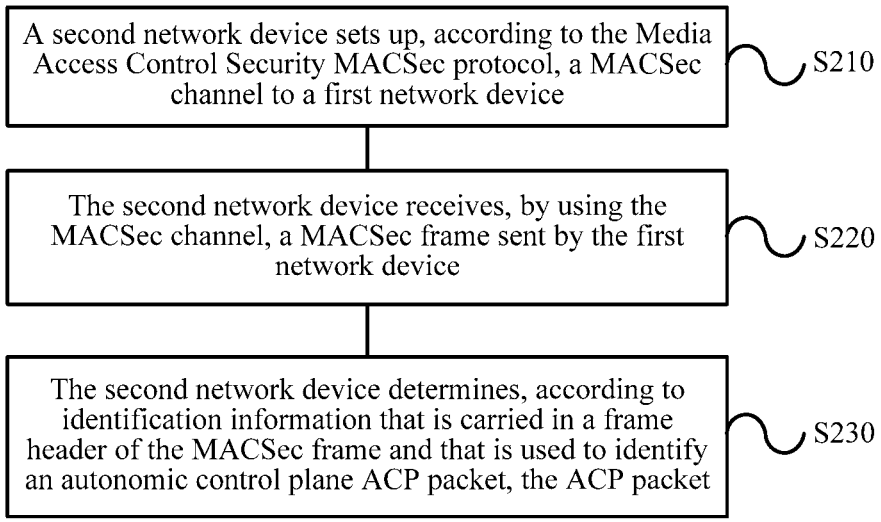
FIG. 5 is a schematic flowchart of a packet transmission method according to another embodiment of the application.

The foregoing describes the packet transmission method in the embodiments of the application in detail from the perspective of a transmit end, that is, the first network device with reference to FIG. 1 to FIG. 4, and the following describes a packet transmission method in the embodiments of the application from the perspective of a receive end, that is, a second network device with reference to FIG. 5.

FIG. 5 is a schematic flowchart of a packet transmission method 200 according to another embodiment of the application. The method 200 may be applied to a self-organizing network and is performed by a first network device in the self-organizing network. The first network device may be a receive node. As shown in FIG. 5, the method 200 includes the following steps.

S210: A second network device sets up, according to the Media Access Control Security MACSec protocol, a MACSec channel to a first network device.

S220: The second network device receives, by using the MACSec channel, a MACSec frame sent by the first network device.

S230: The second network device determines, according to identification information that is carried in a frame header of the MACSec frame and that is used to identify an autonomic control plane ACP packet, the ACP packet.

Specifically, in the self-organizing network, a node may be set to a registrar (Registrar) node. A UDI whitelist of self-organizing nodes is configured for the registrar node. Nodes in the UDI whitelist may join in the self-organizing domain, and the registrar node is connected to a domain CA (a self-organizing domain digital certificate authentication authority) and supports domain certificate (domain certificate) allocation. Each node in the network initiates an adjacency discovery (AD) message, and searches for a neighboring node by using the AD message. The AD message includes a UDI or a domain certificate. Each node may create a neighbor list according to the AD message. After receiving the AD message, the registrar node compares the UDI with the UDI whitelist, and sends the domain certificate to the neighboring node belonging to the UDI whitelist. The neighboring node and the registrar node perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for a neighboring node of the neighboring node of the registrar node, the neighboring node of the registrar node needs to serve as a proxy server (Proxy) and an authenticator, and other steps are the same, thereby setting up MACSec channels between adjacent nodes in the self-organizing network, so that multiple nodes belonging to a same domain form an ACP. In the ACP, the nodes may mutually transmit, by using the MACSec channels, ACP packets encapsulated according to the MACSec protocol.

Therefore, by means of the packet transmission method in this embodiment of the application, the MACSec channel is set up between the second network device and the first network device that are in the self-organizing network according to the MACSec protocol. The second network device receives, by using the MACSec channel, the MACSec frame sent by the first network device, and determines the ACP packet according to the identification information in the frame header of the MACSec frame. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

In this embodiment of the application, each node in the self-organizing network supports a self-organizing feature, and each node has a UDI or a device ID certificate (DevID certificate) of the node. Optionally, an example in which each node obtains a domain certificate by using the UDI is used herein for description, but the application is not limited thereto. In the network, a node is set to a registrar (Registrar) node. The registrar node supports domain certificate allocation and a UDI whitelist of self-organizing nodes is configured for the registrar node. Nodes in the UDI whitelist belong to a same self-organizing domain. Optionally, the registrar node may be pre-configured. The registrar node is a node that can support domain certificate allocation, that is, the registrar node is connected to a digital certificate authentication management authority and can communicate with the digital certificate authentication management authority. That is, the registrar node can allocate the domain certificate to another node by using the digital certificate authentication management authority.

In this embodiment of the application, after the self-organizing feature is enabled, the self-organizing node can send an AD message to a neighboring node, so as to search for the neighboring node of the self-organizing node. Optionally, each node may initiate the AD message once at a time interval, for example, every 10 s. The AD message may include a UDI or a domain certificate. For example, for an AD message sent by the registrar node, the registrar node supports the domain certificate allocation and may first allocate a domain certificate to the registrar node. The AD message sent by the registrar node may include the domain certificate. For an AD message sent by a node having no domain certificate, the AD message may include a UDI.

In this embodiment of the application, the AD message sent by the self-organizing node can merely be sent for a distance of one hop. That is, only the neighboring node can receive the AD message. Therefore, after receiving an AD message sent by a neighboring node, a node may set up a neighbor list for recording the neighboring node belonging to the node. Optionally, the neighbor list may include a UDI of the neighboring node. The UDI is obtained by using the AD message sent by the neighboring node. The neighbor list may further include address information. The address information may be an IPv6 address, an IPv4 address, or a MAC address, and may be determined by using a packet in the sent AD message, but the application is not limited thereto. A UDI and address information of a neighboring node of each node can be determined according to a neighboring node list determined by the node.

In this embodiment of the application, after receiving the AD message sent by the neighboring node, the registrar node compares a UDI in the AD message with the UDI whitelist of the registrar node. If the UDI of the neighboring node matches the UDI whitelist, the registrar node generates a domain certificate according to the UDI, and sends the domain certificate to the neighboring node. The domain certificate is used in a subsequent AD broadcast. In this case, the registrar node and the neighboring node that have the domain certificate belong to a same ACP.

In this embodiment of the application, the AD message that is received by the registrar node and that is sent by the neighboring node may be an AD message of the neighboring node, or may be an AD message that is of the neighboring node of the neighboring node and that is forwarded by the neighboring node. In addition, in comparison with the UDI whitelist, and for nodes belonging to a same domain, the registrar node sends the domain certificate to all the nodes.

Optionally, the domain certificate may be mutually forwarded by the neighboring nodes. Nodes having the domain certificate all belong to a same domain, and the nodes in the self-organizing network belong to a same ACP.

In this embodiment of the application, when each node in the self-organizing network has an DevID certificate of the node, an AD message sent by the node to a neighboring node includes the domain certificate or an SUDI. An AD message of the registrar node may include the domain certificate, and an AD message of a node having no domain certificate includes an SUDI. The neighboring node sends an 802.1AR certificate of the neighboring node to the registrar node. Optionally, the neighboring node may send an 802.1AR certificate of the neighboring node to the registrar node by using a Proxy. The registrar node receiving the message verifies the certificate by using a public key, and is connected to a verification server to verify whether the device can access the domain. If verification succeeds, the registrar node generates a domain certificate according to the SUDI and sends the domain certificate to the corresponding neighboring node. The neighboring node receives the domain certificate and uses the domain certificate in the subsequent AD broadcast. Similarly, the neighboring node of the neighboring node of the registrar node may also obtain the domain certificate by using the method. The registrar node and the neighboring node that have the domain certificate belong to a same ACP.

In S210, the first network device and the second network device that are in the self-organizing network may set up the MACSec channel according to the Media Access Control Security MACSec protocol. The first network device and the second network device may be any two nodes in the self-organizing network. Optionally, the first network device and the second network device may be two neighboring nodes. Specifically, the neighboring node obtaining the domain certificate and the registrar node may perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for the neighboring node of the neighboring node of the registrar node, the neighboring node of the registrar node may serve as a proxy server (Proxy) and an authenticator, and other steps are the same, thereby setting up MACSec channels between adjacent nodes of nodes belonging to a same domain. In this way, packet transmission can be performed between any two nodes, that is, the first network device and the second network device, in the ACP by using the MACSec channel.

Specifically, the neighboring node obtaining the domain certificate sent by the registrar node may initiate authentication to the registrar node, for example, may initiate 802.1X-based authentication. The registrar node may serve as an authenticator (Authenticator) and an authentication server, to implement the mutual authentication between the registrar node and the neighboring node. For example, an EAP-TLS authentication method may be selected, to comply with the 802.1af standard.

In this embodiment of the application, after the authentication succeeds, the registrar node and the neighboring node obtain the packet encryption key by means of the negotiation based on the key generated in the authentication process, and set up an ACP-dedicated secure MACSec channel. Specifically, a PMK generated in the previous authentication between the registrar node and the neighboring node is used as a CAK according to the MKA protocol. Serving as an authenticator, the registrar node is selected as a key server (key server) in the MKA protocol by default, and may generate an SAK according to the 802.1X protocol and according to the CAK, a random number, or the like, encrypt the SAK, and send the encrypted SAK to the neighboring node, so as to facilitate use of the SAK for encryption and signature of an Ethernet frame in subsequent communication.

In this embodiment of the application, after the registrar node and the neighboring node set up the MACSec channel by using the foregoing method, and when the neighboring node of the neighboring node of the registrar node joins in the ACP, the neighboring node of the registrar node may serve as a proxy server (Proxy) and an authenticator, and the neighboring node of the neighboring node of the registrar node obtains the domain certificate by using the same method, further joins in the ACP, and sets up a MACSec channel between the neighboring node of the neighboring node and the neighboring node by means of authentication.

In S220, in the ACP in the self-organizing network, the second network device may receive, by using the MACSec channel, the MACSec frame sent by the first network device. Specifically, any node in the self-organizing network may send an ACP packet to a neighboring node by using a MACSec channel, and the ACP packet is forwarded at least once. The MACSec frame can be transmitted between any two nodes, that is, the first network device and the second network device, in the self-organizing network.

In this embodiment of the application, the frame header of the MACSec frame received by the second network device may include the identification information, and the identification information is used to identify whether the MACSec frame is an ACP packet. Therefore, in S230, the second network device may determine, according to the identification information in the frame header of the MACSec frame, that the MACSec frame is an ACP packet. Another packet can be transmitted by using the MACSec channel at a MAC layer. Therefore, specifically, it may be distinguished according to the identification information carried in the frame header of the MACSec frame whether the MACSec frame carries the ACP packet. Optionally, the ACP packet and the another packet of received packets encapsulated according to the MACSec protocol may be determined by using the following several methods.

Optionally, in an embodiment, an example in which a packet is transmitted between neighboring nodes is used. When a node receives a MACSec frame that is sent by a neighboring node and that is encapsulated according to the MACSec protocol, a frame header of the MACSec frame may carry identification information, and the identification information is used to indicate that a structure of the frame is used to carry an ACP packet. Specifically, if the entire self-organizing network does not use the MACSec on a data plane, a packet encapsulated according to the MACSec protocol is an ACP packet, and another packet may be encapsulated by means of MAC. After being decapsulated, the packet is processed by means of global routing. For example, when the entire self-organizing network does not use the MACSec on the data plane, a packet that is received by the node and sent by the neighboring node and that is encapsulated in an 802.1ae format is a packet encapsulated according to the MACSec protocol. The packet may be understood as the ACP packet. Specifically, as shown in FIG. 2, FIG. 2 shows a MACSec frame encapsulated in the 802.1ae format. A frame header of the MACSec frame may include several fields shown in FIG. 2. The 802.1AE header (802.1AE Header) field may be the identification information and indicates that a structure of the frame is a packet encapsulated according to the MACSec protocol, and the MACSec frame is used to carry an ACP packet. On the contrary, if the 802.1AE header is not included, it may be determined that a structure of the frame is another common packet.

Optionally, in an embodiment, an example in which a packet is transmitted between neighboring nodes is used. When a node receives a MACSec frame that is sent by a neighboring node and that is encapsulated according to the MACSec protocol, the MACSec frame includes identification information that is of an ACP packet and that is used to indicate that the packet is an ACP packet. For example, the identification information may be carried in an Ethernet type field in the frame header of the transmitted MACSec frame. Specifically, the transmitted packet may include the Ethernet type (Ethertype) field. For example, as shown in FIG. 2, the Ethernet type field may be located in an 802.1AE header field. Specifically, as shown in FIG. 3, the 802.1AE header field may include a MACSec Ethertype field, a TCI field, an AN field, an SL field, a PN field, and an SCI field. In the 802.1AE Header field, for the MACSec Ethertype field, that is, the Ethernet type field carrying the identification information, optionally, the MACSec Ethertype field may include the identification information, or may be directly used as the identification information. Optionally, if the field is used as the identification information, it may be set that when a value of the MACSec Ethertype field is a preset value, the packet is an ACP packet; or when a value of the MACSec Ethertype field is not the preset value, the packet is another packet. For example, in the packet encapsulated in the 802.1ae format, a value of the MACSec Ethertype field may be represented by 88e5, and the packet is a common packet. A new value of the MACSec Ethertype field, for example, 88e6, is set to the preset value, and the packet is an ACP packet.

Optionally, in an embodiment, an example in which a packet is transmitted between neighboring nodes is used. When a node receives a MACSec frame that is sent by a neighboring node and that is encapsulated according to the MACSec protocol, a frame header of the MACSec frame includes identification information that is of an ACP packet and that is used to indicate that the packet is an ACP packet. For example, the identification information may be carried in a flag bit field in the frame header of the transmitted MACSec frame, and the flag bit field may be a newly added field or may be an existing field. Specifically, the flag bit field may be an original indicator bit in the packet. For example, in the packet encapsulated in the 802.1ae format, the TCI field and the AN field that are shown in FIG. 3 may be expanded as shown in FIG. 4. v=0 indicates a version (version) bit, and the version bit is originally used to indicate a version of the MACSec and is 0 at present. In this embodiment of the application, the version bit may be used to indicate the ACP packet. When the bit is "1", it indicates that the packet is an ACP packet; or when the bit is "0", it indicates that the packet is another packet. Optionally, a new flag bit may be added to the transmitted packet. The flag bit includes the identification information of the ACP packet. For example, when the flag bit is "0", it indicates that the packet is an ACP packet; or when the flag bit is "1", it indicates that the packet is another packet.

Optionally, in an embodiment, an example in which a packet is transmitted between neighboring nodes is used. When a node receives a MACSec frame that is sent by a neighboring node and that is encapsulated according to the MACSec protocol, a frame header of the MACSec frame includes identification information that is of an ACP packet and that is used to indicate that the packet is an ACP packet. For example, the identification information may be carried in a MAC address field in the transmitted packet, and it is determined according to the MAC address field whether the transmitted packet is an ACP packet. For example, for eight most significant bits of an existing MAC address, a second bit b2 of the eight bits is used to distinguish whether the MAC address is a locally managed MAC address or a global (global) MAC address. Most existing MAC addresses are global. Therefore, the bit b2 may be used as the identification information and is used to indicate whether the packet is an ACP packet. In this case, the locally managed MAC address (virtual MAC) and the global MAC address are both used on a device interface. When the locally managed MAC address is used to transmit the packet, that is, when a value of b2 is 1, the transmitted packet is an ACP packet. When the global MAC address is used to transmit the packet, that is, when a value of b2 is 0, the transmitted packet is another packet, but the application is not limited thereto. Optionally, the identification information of the ACP packet may be carried in another location in the MAC address field. Alternatively, one or more bits may be newly added to the MAC address field to carry the identification information.

In this embodiment of the application, the node in the self-organizing network receives the MACSec frame that is sent by the neighboring node and that is encapsulated according to the MACSec protocol, determines the ACP packet according to the identification information included in the frame header of the MACSec frame, and specifically, may determine, by using the foregoing method, a packet that is an ACP packet.

It should be understood that sequence numbers of the foregoing processes do not mean execution sequences in various embodiments of the application. The execution sequences of the processes should be determined according to functions and internal logic of the processes, and should not be construed as any limitation on the implementation processes of the embodiments of the application.

Therefore, by means of the packet transmission method in this embodiment of the application, the MACSec channel is set up between the second network device and the first network device that are in the self-organizing network according to the MACSec protocol. The second network device receives, by using the MACSec channel, the MACSec frame sent by the first network device, and determines the ACP packet according to the identification information in the frame header of the MACSec frame. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

Figure 6:
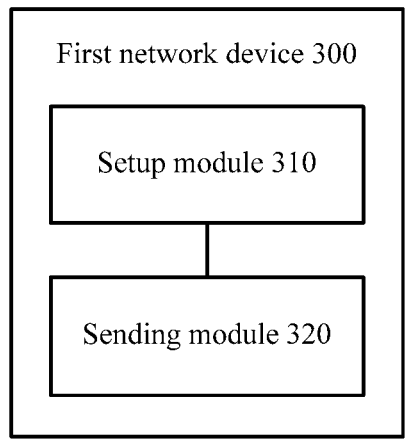
FIG. 6 is a schematic block diagram of a first network device for packet transmission according to an embodiment of the application.
Figure 7:
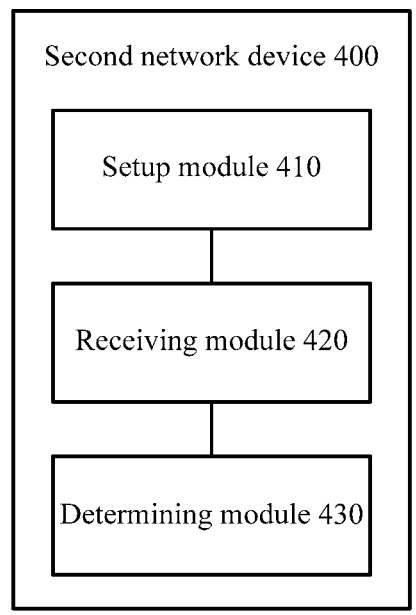
FIG. 7 is a schematic block diagram of a second network device for packet transmission according to an embodiment of the application.

The foregoing describes the packet transmission methods in the embodiments of the application in detail with reference to FIG. 1 to FIG. 5, and the following describes packet transmission apparatuses in the embodiments of the application with reference to FIG. 6 and FIG. 7.

FIG. 6 is a schematic flowchart of a first network device 300 for packet transmission according to an embodiment of the application. The first network device 300 may be a transmit node in a self-organizing network. As shown in FIG. 6, the first network device 300 includes:

a setup module 310, configured to set up, by the first network device according to the Media Access Control Security MACSec protocol, a MACSec channel to a second network device; and a sending module 320, configured to send, by the first network device, an autonomic control plane ACP packet to the second network device by using the MACSec channel that is set up by the setup module, where the ACP packet is carried in a MACSec frame, and a frame header of the MACSec frame carries identification information used to identify the ACP packet.

Specifically, a node in the self-organizing network may be set to a registrar (Registrar) node. A UDI whitelist of self-organizing nodes is configured for the registrar node. Nodes in the UDI whitelist may join in the self-organizing domain, and the registrar node is connected to a domain CA (a self-organizing domain digital certificate authentication authority) and supports domain certificate (domain certificate) allocation. Each node in the network initiates an adjacency discovery (AD) message, and searches for a neighboring node by using the AD message. The AD message includes a UDI or a domain certificate. Each node may create a neighbor list according to the AD message. After receiving the AD message, the registrar node compares the UDI with the UDI whitelist, and sends the domain certificate to the neighboring node belonging to the UDI whitelist. The neighboring node and the registrar node perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for a neighboring node of the neighboring node of the registrar node, the neighboring node of the registrar node needs to serve as a proxy server (Proxy) and an authenticator, and other steps are the same, thereby setting up MACSec channels between adjacent nodes in the self-organizing network, so that multiple nodes belonging to a same domain form an ACP. In the ACP, the nodes may mutually transmit, by using the MACSec channels, ACP packets encapsulated according to the MACSec protocol.

Therefore, by means of the first network device for packet transmission in this embodiment of the application, the MACSec channel is set up between the setup module of the first network device and the second network device that are in the self-organizing network according to the MACSec protocol. The sending module of the first network device sends the ACP packet to the second network device by using the MACSec channel. The ACP packet is carried in the MACSec frame, and the frame header of the MACSec frame carries the identification information used to identify the ACP packet. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

In this embodiment of the application, each node in the self-organizing network supports a self-organizing feature, and each node has a UDI or a device ID certificate (DevID certificate) of the node. Optionally, an example in which each node obtains a domain certificate by using the UDI is used herein for description, but the application is not limited thereto. In the network, a node is set to a registrar (Registrar) node. The registrar node supports domain certificate allocation and a UDI whitelist of self-organizing nodes is configured for the registrar node. Nodes in the UDI whitelist belong to a same self-organizing domain. Optionally, the registrar node may be pre-configured. The registrar node is a node that can support domain certificate allocation, that is, the registrar node is connected to a digital certificate authentication management authority and can communicate with the digital certificate authentication management authority. That is, the registrar node can allocate the domain certificate to another node by using the digital certificate authentication management authority.

In this embodiment of the application, after the self-organizing feature is enabled, the self-organizing node can send an AD message to a neighboring node, so as to search for the neighboring node of the self-organizing node. Optionally, each node may initiate the AD message once at a time interval, for example, every 10 s. The AD message may include a UDI or a domain certificate. For example, for an AD message sent by the registrar node, the registrar node supports the domain certificate allocation and may first allocate a domain certificate to the registrar node. The AD message sent by the registrar node may include the domain certificate. For an AD message sent by a node having no domain certificate, the AD message may include a UDI.

In this embodiment of the application, the AD message sent by the self-organizing node can merely be sent for a distance of one hop. That is, only the neighboring node can receive the AD message. Therefore, after receiving an AD message sent by a neighboring node, a node may set up a neighbor list for recording the neighboring node belonging to the node. Optionally, the neighbor list may include a UDI of the neighboring node. The UDI is obtained by using the AD message sent by the neighboring node. The neighbor list may further include address information. The address information may be an IPv6 address, an IPv4 address, or a MAC address, and may be determined by using a packet in the sent AD message, but the application is not limited thereto. A UDI and address information of a neighboring node of each node can be determined according to a neighboring node list determined by the node.

In this embodiment of the application, after receiving the AD message sent by the neighboring node, the registrar node compares a UDI in the AD message with the UDI whitelist of the registrar node. If the UDI of the neighboring node matches the UDI whitelist, the registrar node generates a domain certificate according to the UDI, and sends the domain certificate to the neighboring node. The domain certificate is used in a subsequent AD broadcast. In this case, the registrar node and the neighboring node that have the domain certificate belong to a same ACP.

In this embodiment of the application, the AD message that is received by the registrar node and that is sent by the neighboring node may be an AD message of the neighboring node, or may be an AD message that is of the neighboring node of the neighboring node and that is forwarded by the neighboring node. In addition, in comparison with the UDI whitelist, and for nodes belonging to a same domain, the registrar node sends the domain certificate to all the nodes. Optionally, the domain certificate may be mutually forwarded by the neighboring nodes. Nodes having the domain certificate all belong to a same domain, and the nodes in the self-organizing network belong to a same ACP.

In this embodiment of the application, when each node in the self-organizing network has an DevID certificate of the node, an AD message sent by the node to a neighboring node includes the domain certificate or an SUDI. An AD message of the registrar node may include the domain certificate, and an AD message of a node having no domain certificate includes an SUDI. The neighboring node sends an 802.1AR certificate of the neighboring node to the registrar node. Optionally, the neighboring node may send an 802.1AR certificate of the neighboring node to the registrar node by using a Proxy. The registrar node receiving the message verifies the certificate by using a public key, and is connected to a verification server to verify whether the device can access the domain. If verification succeeds, the registrar node generates a domain certificate according to the SUDI and sends the domain certificate to the corresponding neighboring node. The neighboring node receives the domain certificate and uses the domain certificate in the subsequent AD broadcast. Similarly, the neighboring node of the neighboring node of the registrar node may also obtain the domain certificate by using the method. The registrar node and the neighboring node that have the domain certificate belong to a same ACP.

In this embodiment of the application, the setup module 310 of the first network device in the self-organizing network sets up the MACSec channel to the second network device according to the MACSec protocol. The first network device and the second network device may be any two nodes in the self-organizing network. Optionally, the first network device and the second network device may be two neighboring nodes. Specifically, the neighboring node obtaining the domain certificate and the registrar node may perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for the neighboring node of the neighboring node of the registrar node, the neighboring node of the registrar node may serve as a proxy server (Proxy) and an authenticator, and other steps are the same, thereby setting up MACSec channels between adjacent nodes of nodes belonging to a same domain. In this way, packet transmission can be performed between any two nodes, that is, the first network device and the second network device, in the ACP by using the MACSec channel.

Specifically, the neighboring node obtaining the domain certificate sent by the registrar node may initiate authentication to the registrar node, for example, may initiate 802.1X-based authentication. The registrar node may serve as an authenticator (Authenticator) and an authentication server, to implement the mutual authentication between the registrar node and the neighboring node. For example, an EAP-TLS authentication method may be selected, to comply with the 802.1af standard.

In this embodiment of the application, after the authentication succeeds, the registrar node and the neighboring node obtain the packet encryption key by means of the negotiation based on the key generated in the authentication process, and set up an ACP-dedicated secure MACSec channel. Specifically, a PMK generated in the previous authentication between the registrar node and the neighboring node is used as a CAK according to the MKA protocol. Serving as an authenticator, the registrar node is selected as a key server (key server) in the MKA protocol by default, and may generate an SAK according to the 802.1X protocol and according to the CAK, a random number, or the like, encrypt the SAK, and send the encrypted SAK to the neighboring node, so as to facilitate use of the SAK for encryption and signature of an Ethernet frame in subsequent communication.

In this embodiment of the application, after the registrar node and the neighboring node set up the MACSec channel by using the foregoing method, and when the neighboring node of the neighboring node of the registrar node joins in the ACP, the neighboring node of the registrar node may serve as a proxy server (Proxy) and an authenticator, and the neighboring node of the neighboring node of the registrar node obtains the domain certificate by using the same method, further joins in the ACP, and sets up a MACSec channel between the neighboring node of the neighboring node and the neighboring node by means of authentication.

In this embodiment of the application, in the ACP in the self-organizing network, the sending module 320 of the first network device may send the ACP packet to the second network device by using the MACSec channel that is set up by the setup module 310. Specifically, a sending module 320 of any node in the self-organizing network may send an ACP packet to a neighboring node by using a MACSec channel. The ACP packet is forwarded at least once. The ACP packet can be transmitted between any two nodes, that is, the first network device and the second network device, in the self-organizing network. Another packet can be transmitted by using the MACSec channel at a MAC layer. Therefore, specifically, the identification information may be carried in the frame header of the MACSec frame, and it may be distinguished according to the identification information whether the MACSec frame carries the ACP packet. Optionally, the ACP packet and the another packet of packets encapsulated according to the MACSec protocol may be determined by using the following several methods.

Optionally, in an embodiment, an example in which a packet is transmitted between neighboring nodes is used. When a sending module 320 of a node sends, to a neighboring node, a MACSec frame encapsulated according to the MACSec protocol, a frame header of the MACSec frame may carry identification information, and the identification information is used to indicate that a structure of the frame is used to carry an ACP packet. Specifically, if the entire self-organizing network does not use the MACSec on a data plane, a packet encapsulated according to the MACSec protocol is an ACP packet, and another packet may be encapsulated by means of MAC. After being decapsulated, the packet is processed by means of global routing. For example, when the entire self-organizing network does not use the MACSec on the data plane, a packet that is sent by the node to the neighboring node and that is encapsulated in an 802.1ae format is a packet encapsulated according to the MACSec protocol. The packet may be understood as the ACP packet. Specifically, as shown in FIG. 2, FIG. 2 shows a MACSec frame encapsulated in the 802.1ae format. A frame header of the MACSec frame may include several fields shown in FIG. 2. The 802.1AE header (802.1AE Header) field may be the identification information and indicates that a structure of the frame is a packet encapsulated according to the MACSec protocol, and the MACSec frame is used to carry an ACP packet. On the contrary, if the 802.1AE header is not included, it may be determined that a structure of the frame is another common packet.

Optionally, in an embodiment, an example in which a packet is transmitted between neighboring nodes is used. When a sending module 320 of a node sends, to a neighboring node, a MACSec frame encapsulated according to the MACSec protocol, a frame header of the MACSec frame may carry identification information, and the identification information is used to indicate that a structure of the frame is used to carry an ACP packet. For example, the identification information may be carried in an Ethernet type field in the transmitted packet. Specifically, the transmitted packet may include the Ethernet type (Ethertype) field. For example, as shown in FIG. 2, the Ethernet type field may be located in an 802.1AE header field. Specifically, as shown in FIG. 3, the 802.1AE header field may include a MACSec Ethertype field, a TCI field, an AN field, an SL field, a PN field, and an SCI field. In the 802.1AE Header field, for the MACSec Ethertype field, that is, the Ethernet type field carrying the identification information, optionally, the MACSec Ethertype field may include the identification information, or may be directly used as the identification information. Optionally, if the field is used as the identification information, it may be set that when a value of the MACSec Ethertype field is a preset value, the packet is an ACP packet; or when a value of the MACSec Ethertype field is not the preset value, the packet is another packet. For example, in the packet encapsulated in the 802.1ae format, a value of the MACSec Ethertype field may be represented by 88e5, and the packet is a common packet. A new value of the MACSec Ethertype field, for example, 88e6, is set to the preset value, and the packet is an ACP packet.

Optionally, in an embodiment, an example in which a packet is transmitted between neighboring nodes is used. When a sending module 320 of a node sends, to a neighboring node, a MACSec frame encapsulated according to the MACSec protocol, a frame header of the MACSec frame may include identification information used to distinguish an ACP packet. For example, the identification information may be carried in a flag bit field in the frame header of the transmitted MACSec frame, and the flag bit field may be a newly added field or may be an existing field. Specifically, the flag bit field may be an original indicator bit in the packet. For example, in the packet encapsulated in the 802.1ae format, the TCI field and the AN field that are shown in FIG. 3 may be expanded as shown in FIG. 4. v=0 indicates a version (version) bit, and the version bit is originally used to indicate a version of the MACSec and is 0 at present. In this embodiment of the application, the version bit may be used to indicate the ACP packet. When the bit is "1", it indicates that the packet is an ACP packet; or when the bit is "0", it indicates that the packet is another packet. Optionally, a new flag bit may be added to the transmitted packet. The flag bit includes the identification information of the ACP packet. For example, when the flag bit is "0", it indicates that the packet is an ACP packet; or when the flag bit is "1", it indicates that the packet is another packet.

Optionally, in an embodiment, an example in which a packet is transmitted between neighboring nodes is used. When a sending module 320 of a node sends, to a neighboring node, a MACSec frame encapsulated according to the MACSec protocol, a frame header of the MACSec frame may include identification information that is of an ACP packet and that is used to indicate that the packet is an ACP packet. For example, the identification information may be carried in a MAC address field in the transmitted packet, and it is determined according to the MAC address field whether the transmitted packet is an ACP packet. For example, for eight most significant bits of an existing MAC address, a second bit b2 of the eight bits is used to distinguish whether the MAC address is a locally managed MAC address or a global (global) MAC address. Most existing MAC addresses are global. Therefore, the bit b2 may be used as the identification information and is used to indicate whether the packet is an ACP packet. In this case, the locally managed MAC address (virtual MAC) and the global MAC address are both used on a device interface. When the locally managed MAC address is used to transmit the packet, that is, when a value of b2 is 1, the transmitted packet is an ACP packet. When the global MAC address is used to transmit the packet, that is, when a value of b2 is 0, the transmitted packet is another packet, but the application is not limited thereto. Optionally, the identification information of the ACP packet may be carried in another location in the MAC address field. Alternatively, one or more bits may be newly added to the MAC address field to carry the identification information.

In this embodiment of the application, each node in the ACP may send, to the neighboring node by using the foregoing method and by using the sending module 320, the ACP packet encapsulated according to the MACSec protocol.

It should be understood that the first network device 300 for packet transmission in this embodiment of the application may correspondingly perform the method 100 in the embodiments of the application. The foregoing and other operations and/or functions of the modules of the first network device 300 for packet transmission are respectively intended to implement the corresponding procedures in each method in FIG. 1. For brevity, details are not described herein again.

Therefore, by means of the first network device for packet transmission in this embodiment of the application, the MACSec channel is set up between the setup module of the first network device and the second network device that are in the self-organizing network according to the MACSec protocol. The sending module of the first network device sends the ACP packet to the second network device by using the MACSec channel. The ACP packet is carried in the MACSec frame, and the frame header of the MACSec frame carries the identification information used to identify the ACP packet. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

FIG. 7 is a schematic flowchart of a second network device 400 for packet transmission according to another embodiment of the application. The second network device 400 may be a receive node in a self-organizing network. As shown in FIG. 7, the second network device 400 includes:

a setup module 410, configured to set up, by the second network device according to the Media Access Control Security MACSec protocol, a MACSec channel to a first network device;

a receiving module 420, configured to receive, by the second network device by using the MACSec channel that is set up by the setup module, a MACSec frame sent by the first network device; and a determining module 430, configured to determine, by the second network device according to identification information that is carried in a frame header of the MACSec frame received by the receiving module and that is used to identify an autonomic control plane ACP packet, the ACP packet.

Specifically, a node in the self-organizing network may be set to a registrar (Registrar) node. A UDI whitelist of self-organizing nodes is configured for the registrar node. Nodes in the UDI whitelist may join in the self-organizing domain, and the registrar node is connected to a domain CA and supports domain certificate (domain certificate) allocation. Each node in the network initiates an adjacency discovery (AD) message, and searches for a neighboring node by using the AD message. The AD message includes a UDI or a domain certificate. Each node may create a neighbor list according to the AD message. After receiving the AD message, the registrar node compares the UDI with the UDI whitelist, and sends the domain certificate to the neighboring node belonging to the UDI whitelist. The neighboring node and the registrar node perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for a neighboring node of the neighboring node of the registrar node, the neighboring node of the registrar node needs to serve as a proxy server (Proxy) and an authenticator, and other steps are the same, thereby setting up MACSec channels between adjacent nodes in the self-organizing network, so that multiple nodes belonging to a same domain form an ACP. In the ACP, the nodes may mutually transmit, by using the MACSec channels, ACP packets encapsulated according to the MACSec protocol.

Therefore, by means of the second network device for packet transmission in this embodiment of the application, the MACSec channel is set up between the second network device and the first network device according to the MACSec protocol. The second network device receives, by using the MACSec channel, the MACSec frame sent by the first network device, and determines the ACP packet according to the identification information in the MACSec frame. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network by using the MACSec channel.

In this embodiment of the application, each node in the self-organizing network supports a self-organizing feature, and each node has a UDI or a device ID certificate (DevID certificate) of the node. Optionally, an example in which each node obtains a domain certificate by using the UDI is used herein for description, but the application is not limited thereto. In the network, a node is set to a registrar (Registrar) node. The registrar node supports domain certificate allocation and a UDI whitelist of self-organizing nodes is configured for the registrar node. Nodes in the UDI whitelist belong to a same self-organizing domain. Optionally, the registrar node may be pre-configured. The registrar node is a node that can support domain certificate allocation, that is, the registrar node is connected to a digital certificate authentication management authority and can communicate with the digital certificate authentication management authority. That is, the registrar node can allocate the domain certificate to another node by using the digital certificate authentication management authority.

In this embodiment of the application, after the self-organizing feature is enabled, the self-organizing node can send an AD message to a neighboring node, so as to search for the neighboring node of the self-organizing node. Optionally, each node may initiate the AD message once at a time interval, for example, every 10 s. The AD message may include a UDI or a domain certificate. For example, for an AD message sent by the registrar node, the registrar node supports the domain certificate allocation and may first allocate a domain certificate to the registrar node. The AD message sent by the registrar node may include the domain certificate. For an AD message sent by a node having no domain certificate, the AD message may include a UDI.

In this embodiment of the application, the AD message sent by the self-organizing node can merely be sent for a distance of one hop. That is, only the neighboring node can receive the AD message. Therefore, after receiving an AD message sent by a neighboring node, a node may set up a neighbor list for recording the neighboring node belonging to the node. Optionally, the neighbor list may include a UDI of the neighboring node. The UDI is obtained by using the AD message sent by the neighboring node. The neighbor list may further include address information. The address information may be an IPv6 address, an IPv4 address, or a MAC address, and may be determined by using a packet in the sent AD message, but the application is not limited thereto. A UDI and address information of a neighboring node of each node can be determined according to a neighboring node list determined by the node.

In this embodiment of the application, after receiving the AD message sent by the neighboring node, the registrar node compares a UDI in the AD message with the UDI whitelist of the registrar node. If the UDI of the neighboring node matches the UDI whitelist, the registrar node generates a domain certificate according to the UDI, and sends the domain certificate to the neighboring node. The domain certificate is used in a subsequent AD broadcast. In this case, the registrar node and the neighboring node that have the domain certificate belong to a same ACP.

In this embodiment of the application, the AD message that is received by the registrar node and that is sent by the neighboring node may be an AD message of the neighboring node, or may be an AD message that is of the neighboring node of the neighboring node and that is forwarded by the neighboring node. In addition, in comparison with the UDI whitelist, and for nodes belonging to a same domain, the registrar node sends the domain certificate to all the nodes. Optionally, the domain certificate may be mutually forwarded by the neighboring nodes. Nodes having the domain certificate all belong to a same domain, and the nodes in the self-organizing network belong to a same ACP.

In this embodiment of the application, when each node in the self-organizing network has an DevID certificate of the node, an AD message sent by the node to a neighboring node includes the domain certificate or an SUDI. An AD message of the registrar node may include the domain certificate, and an AD message of a node having no domain certificate includes an SUDI. The neighboring node sends an 802.1AR certificate of the neighboring node to the registrar node. Optionally, the neighboring node may send an 802.1AR certificate of the neighboring node to the registrar node by using a Proxy. The registrar node receiving the message verifies the certificate by using a public key, and is connected to a verification server to verify whether the device can access the domain. If verification succeeds, the registrar node generates a domain certificate according to the SUDI and sends the domain certificate to the corresponding neighboring node. The neighboring node receives the domain certificate and uses the domain certificate in the subsequent AD broadcast. Similarly, the neighboring node of the neighboring node of the registrar node may also obtain the domain certificate by using the method. The registrar node and the neighboring node that have the domain certificate belong to a same ACP.

In this embodiment of the application, the setup module 410 of the first network device in the self-organizing network sets up the MACSec channel to the first network device according to the MACSec protocol. The first network device and the second network device may be any two nodes in the self-organizing network. Optionally, the first network device and the second network device may be two neighboring nodes. Specifically, the neighboring node obtaining the domain certificate and the registrar node may perform, based on the domain certificate, mutual authentication, obtain, after the authentication succeeds, a packet encryption key by means of negotiation based on a key generated in an authentication process, and set up a MACSec channel between the registrar node and the neighboring node according to the MACSec protocol. Similarly, for the neighboring node of the neighboring node of the registrar node, the neighboring node of the registrar node may serve as a proxy server (Proxy) and an authenticator, and other steps are the same, thereby setting up MACSec channels between adjacent nodes of nodes belonging to a same domain. In this way, packet transmission can be performed between any two nodes, that is, the first network device and the second network device, in the ACP by using the MACSec channel.

Specifically, the neighboring node obtaining the domain certificate sent by the registrar node may initiate authentication to the registrar node, for example, may initiate 802.1X-based authentication. The registrar node may serve as an authenticator (Authenticator) and an authentication server, to implement the mutual authentication between the registrar node and the neighboring node. For example, an EAP-TLS authentication method may be selected, to comply with the 802.1af standard.

In this embodiment of the application, after the authentication succeeds, the registrar node and the neighboring node obtain the packet encryption key by means of the negotiation based on the key generated in the authentication process, and set up an ACP-dedicated secure MACSec channel. Specifically, a PMK generated in the previous authentication between the registrar node and the neighboring node is used as a CAK according to the MKA protocol. Serving as an authenticator, the registrar node is selected as a key server (key server) in the MKA protocol by default, and may generate an SAK according to the 802.1X protocol and according to the CAK, a random number, or the like, encrypt the SAK, and send the encrypted SAK to the neighboring node, so as to facilitate use of the SAK for encryption and signature of an Ethernet frame in subsequent communication.

In this embodiment of the application, after the registrar node and the neighboring node set up the MACSec channel by using the foregoing method, and when the neighboring node of the neighboring node of the registrar node joins in the ACP, the neighboring node of the registrar node may serve as a proxy server (Proxy) and an authenticator, and the neighboring node of the neighboring node of the registrar node obtains the domain certificate by using the same method, further joins in the ACP, and sets up a MACSec channel between the neighboring node of the neighboring node and the neighboring node by means of authentication.

In this embodiment of the application, in the ACP in the self-organizing network, the receiving module 420 of the second network device may receive, by using the MACSec channel, the MACSec frame sent by the first network device. Specifically, any node in the self-organizing network may send an ACP packet to a neighboring node by using a MACSec channel, and the ACP packet is forwarded at least once. The MACSec frame can be transmitted between any two nodes, that is, the first network device and the second network device, in the self-organizing network.

In this embodiment of the application, the frame header of the MACSec frame received by the receiving module 420 of the second network device may include the identification information, and the identification information is used to identify whether the MACSec frame is an ACP packet. Therefore, the determining module 430 of the second network device may determine, according to the identification information in the frame header of the MACSec frame, that the MACSec frame is an ACP packet. Another packet can be transmitted by using the MACSec channel at a MAC layer. Therefore, specifically, it may be distinguished according to the identification information carried in the frame header of the MACSec frame whether the MACSec frame carries the ACP packet. Optionally, the ACP packet and the another packet of received packets encapsulated according to the MACSec protocol may be determined by using the following several methods.

Optionally, in an embodiment, an example in which a packet is transmitted between neighboring nodes is used. When a receiving module 420 of a node receives a MACSec frame that is sent by a neighboring node and that is encapsulated according to the MACSec protocol, a determining module 430 may determine an ACP packet according to identification information carried in a frame header of the MACSec frame. Specifically, if the entire self-organizing network does not use the MACSec on a data plane, a packet encapsulated according to the MACSec protocol is an ACP packet, and another packet may be encapsulated by means of MAC. After being decapsulated, the packet is processed by means of global routing. For example, when the entire self-organizing network does not use the MACSec on the data plane, a packet that is received by the node and sent by the neighboring node and that is encapsulated in an 802.1ae format is a packet encapsulated according to the MACSec protocol. The packet may be understood as the ACP packet. Specifically, as shown in FIG. 2, FIG. 2 shows a MACSec frame encapsulated in the 802.1ae format. A frame header of the MACSec frame may include several fields shown in FIG. 2. The 802.1AE header (802.1AE Header) field may be the identification information and indicates that a structure of the frame is a packet encapsulated according to the MACSec protocol, and the MACSec frame is used to carry an ACP packet. On the contrary, if the 802.1AE header is not included, it may be determined that a structure of the frame is another common packet.

Optionally, in an embodiment, an example in which a packet is transmitted between neighboring nodes is used. When a receiving module 420 of a node receives a MACSec frame that is sent by a neighboring node and that is encapsulated according to the MACSec protocol, a determining module 430 may determine, according to identification information that is of an ACP packet and that is included in the MACSec frame, that the packet is an ACP packet. For example, the identification information may be carried in an Ethernet type field in the frame header of the transmitted MACSec frame. Specifically, the transmitted packet may include the Ethernet type (Ethertype) field. For example, as shown in FIG. 2, the Ethernet type field may be located in an 802.1AE header field. Specifically, as shown in FIG. 3, the 802.1AE header field may include a MACSec Ethertype field, a TCI field, an AN field, an SL field, a PN field, and an SCI field. In the 802.1AE Header field, for the MACSec Ethertype field, that is, the Ethernet type field carrying the identification information, optionally, the MACSec Ethertype field may include the identification information, or may be directly used as the identification information. Optionally, if the field is used as the identification information, it may be set that when a value of the MACSec Ethertype field is a preset value, the packet is an ACP packet; or when a value of the MACSec Ethertype field is not the preset value, the packet is another packet. For example, in the packet encapsulated in the 802.1ae format, a value of the MACSec Ethertype field may be represented by 88e5, and the packet is a common packet. A new value of the MACSec Ethertype field, for example, 88e6, is set to the preset value, and the packet is an ACP packet.

Optionally, in an embodiment, an example in which a packet is transmitted between neighboring nodes is used. When a receiving module 420 of a node receives a MACSec frame that is sent by a neighboring node and that is encapsulated according to the MACSec protocol, a determining module 430 may determine, according to identification information that is of an ACP packet and that is included in a frame header of the MACSec frame, that the packet is an ACP packet. For example, the identification information may be carried in a flag bit field in the frame header of the transmitted MACSec frame, and the flag bit field may be a newly added field or may be an existing field. Specifically, the flag bit field may be an original indicator bit in the packet. For example, in the packet encapsulated in the 802.1ae format, the TCI field and the AN field that are shown in FIG. 3 may be expanded as shown in FIG. 4. v=0 indicates a version (version) bit, and the version bit is originally used to indicate a version of the MACSec and is 0 at present. In this embodiment of the application, the version bit may be used to indicate the ACP packet. When the bit is "1", it indicates that the packet is an ACP packet; or when the bit is "0", it indicates that the packet is another packet. Optionally, a new flag bit may be added to the transmitted packet. The flag bit includes the identification information of the ACP packet. For example, when the flag bit is "0", it indicates that the packet is an ACP packet; or when the flag bit is "1", it indicates that the packet is another packet.

Optionally, in an embodiment, an example in which a packet is transmitted between neighboring nodes is used. When a receiving module 420 of a node receives a MACSec frame that is sent by a neighboring node and that is encapsulated according to the MACSec protocol, a determining module 430 may determine, according to identification information that is of an ACP packet and that is included in a frame header of the MACSec frame, that the packet is an ACP packet. For example, the identification information may be carried in a MAC address field in the transmitted packet, and it is determined according to the MAC address field whether the transmitted packet is an ACP packet. For example, for eight most significant bits of an existing MAC address, a second bit b2 of the eight bits is used to distinguish whether the MAC address is a locally managed MAC address or a global (global) MAC address. Most existing MAC addresses are global. Therefore, the bit b2 may be used as the identification information and is used to indicate whether the packet is an ACP packet. In this case, the locally managed MAC address (virtual MAC) and the global MAC address are both used on a device interface. When the locally managed MAC address is used to transmit the packet, that is, when a value of b2 is 1, the transmitted packet is an ACP packet. When the global MAC address is used to transmit the packet, that is, when a value of b2 is 0, the transmitted packet is another packet, but the application is not limited thereto. Optionally, the identification information of the ACP packet may be carried in another location in the MAC address field. Alternatively, one or more bits may be newly added to the MAC address field to carry the identification information.

In this embodiment of the application, the receiving module 420 of the node in the self-organizing network receives the MACSec frame that is sent by the neighboring node and that is encapsulated according to the MACSec protocol, and the determining module 430 determines the ACP packet according to the identification information included in the frame header of the MACSec frame, and specifically, may determine, by using the foregoing method, a packet that is an ACP packet.

It should be understood that the second network device 400 for packet transmission in this embodiment of the application may correspondingly perform the method 200 in the embodiments of the application. The foregoing and other operations and/or functions of the modules of the second network device 400 for packet transmission are respectively intended to implement the corresponding procedures in each method in FIG. 5. For brevity, details are not described herein again.

Therefore, by means of the second network device for packet transmission in this embodiment of the application, the MACSec channel is set up between the second network device and the first network device according to the MACSec protocol. The second network device receives, by using the MACSec channel, the MACSec frame sent by the first network device, and determines the ACP packet according to the identification information in the MACSec frame. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network by using the MACSec channel.

Figure 8:
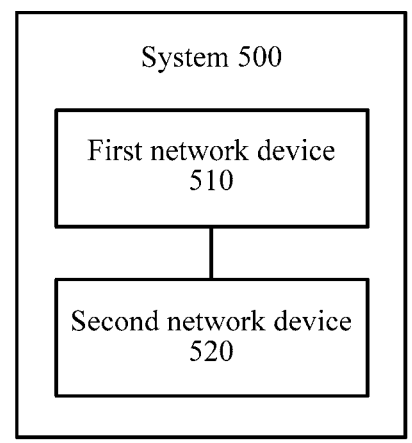
FIG. 8 is a schematic block diagram of a packet transmission system according to an embodiment of the application.

As shown in FIG. 8, an embodiment of the application further provides a packet transmission system 500. The system 500 may include a first network device 510 and a second network device 520. The first network device 510 sets up a MACSec channel to the second network device 520 according to the MACSec protocol. The first network device 510 sends an ACP packet to the second network device 520 by using the MACSec channel, where the ACP packet is carried in a MACSec frame, and a frame header of the MACSec frame carries identification information used to identify the ACP packet. The second network device 520 receives the MACSec frame, and the second network device 520 determines the ACP packet according to the identification information that is carried in the frame header of the MACSec frame and that is used to identify the ACP packet.

The first network device 510 may be the first network device 300 shown in FIG. 6, and the second network device 520 may be the second network device 400 shown in FIG. 7.

The first network device 510 may further include the setup module 310 and the sending module 320 that are shown in FIG. 6. The second network device 520 may further include the setup module 410, the receiving module 420, and the determining module 430 that are shown in FIG. 7.

Therefore, the packet transmission system in this embodiment of the application includes the first network device and the second network device that are in a self-organizing network. The MACSec channel is set up between the first network device and the second network device according to the MACSec protocol, and the MACSec frame can be transmitted between the first network device and the second network device by using the MACSec channel. The frame header of the MACSec frame carries the identification information, and the ACP packet can be indicated according to the identification information. Therefore, a routable interface address and a link-local address that is used to set up an IPSec do not need to be both configured on an interface, and a MACSec security mechanism is provided for an ACP according to the MACSec protocol without using an L3 tunnel, thereby improving efficiency. In addition, the ACP packet in the MACSec frame can be distinguished by using the identification information, so that the ACP packet can be transmitted between the first network device and the second network device that are in the self-organizing network.

Figure 9:
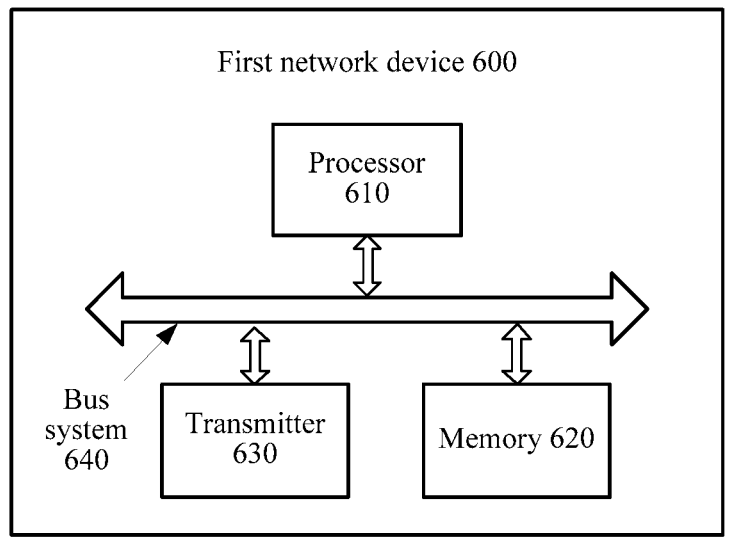
FIG. 9 is a schematic block diagram of a first network device for packet transmission according to another embodiment of the application.

As shown in FIG. 9, an embodiment of the application further provides a first network device 600 for packet transmission. The first network device 600 includes a processor 610, a memory 620, a transmitter 630, and a bus system 640. The processor 610, the memory 620, and the transmitter 630 are connected by using the bus system 640. The memory 620 is configured to store an instruction. The processor 610 is configured to execute the instruction stored in the memory 620, to control the transmitter 630 to send a signal. The processor 610 is configured to set up, by the first network device according to the Media Access Control Security MACSec protocol, a MACSec channel to a second network device. The transmitter 630 is configured to send, by the first network device, an autonomic control plane ACP packet to the second network device by using the MACSec channel, where the ACP packet is carried in the MACSec frame, and a frame header of the MACSec frame carries identification information used to identify the ACP packet.

Therefore, by means of the first network device for packet transmission in this embodiment of the application, the MACSec channel is set up between the setup module of the first network device and the second network device that are in the self-organizing network according to the MACSec protocol. The sending module of the first network device sends the ACP packet to the second network device by using the MACSec channel. The ACP packet is carried in the MACSec frame, and the frame header of the MACSec frame carries the identification information used to identify the ACP packet. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

It should be understood that in this embodiment of the application, the processor 610 may be a central processing unit (CPU), or the processor 610 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 620 may include a read-only memory and a random access memory, and provides an instruction and data to the processor 610. A part of the memory 620 may further include a non-volatile random access memory. For example, the memory 620 may further store device type information.

The bus system 640 may further include a power bus, a control bus, a status signal bus, and the like in addition to a data bus. However, for clear description, various types of buses in the figure are all marked as the bus system 640.

In an implementation process, steps of the foregoing method may be implemented by a hardware integrated logic circuit in the processor 610 or by an instruction in a software form. Steps of the method disclosed with reference to the embodiments of the application may be directly embodied as being performed by a hardware processor or by a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 620, and the processor 610 reads information in the memory 620 and completes the steps in the foregoing method in combination with hardware of the processor. To avoid repetition, detailed description is not provided herein.

Optionally, in an embodiment, the identification information is carried in an Ethernet type field in the frame header of the MACSec frame, and the Ethernet type field is used to indicate that the MACSec frame is used to carry the ACP packet.

Optionally, in an embodiment, the identification information is carried in a flag bit field in the frame header of the MACSec frame, and the flag bit field is a newly added field or a version field.

Optionally, in an embodiment, the identification information is carried in a MAC address field in the frame header of the MACSec frame.

It should be understood that the first network device 600 for packet transmission in this embodiment of the application may correspond to the first network device 300 for packet transmission in the embodiments of the application, and may correspond to a corresponding entity for performing the method 100 in the embodiments of the application. The foregoing and other operations and/or functions of the modules of the first network device 600 are respectively intended to implement the corresponding procedures in each method in FIG. 1. For brevity, details are not described herein again.

Therefore, by means of the first network device for packet transmission in this embodiment of the application, the MACSec channel is set up between the setup module of the first network device and the second network device that are in the self-organizing network according to the MACSec protocol. The sending module of the first network device sends the ACP packet to the second network device by using the MACSec channel. The ACP packet is carried in the MACSec frame, and the frame header of the MACSec frame carries the identification information used to identify the ACP packet. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network.

Figure 10:
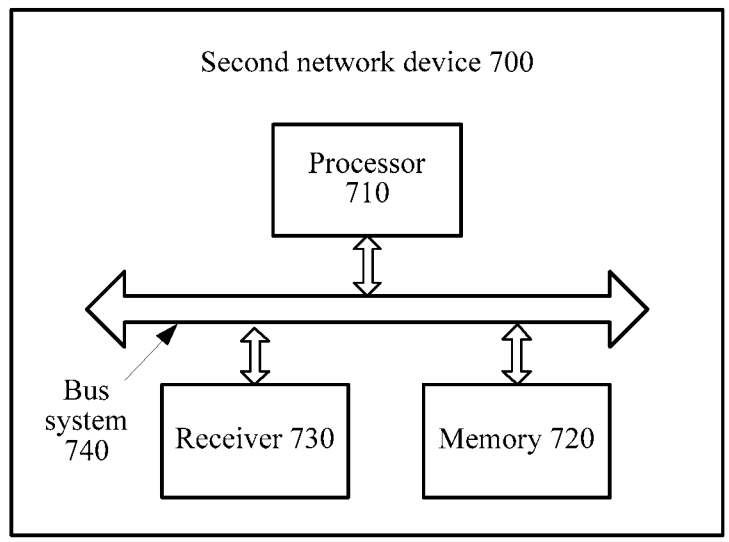
FIG. 10 is a schematic block diagram of a second network device for packet transmission according to another embodiment of the application.

As shown in FIG. 10, an embodiment of the application further provides a second network device 700 for packet transmission. The second network device 700 includes a processor 710, a memory 720, a receiver 730, and a bus system 740. The processor 710, the memory 720, and the receiver 730 are connected by using the bus system 740. The memory 720 is configured to store an instruction. The processor 710 is configured to execute the instruction stored in the memory 720, to control the receiver 730 to receive a signal. The processor 710 is configured to set up, by the second network device according to the Media Access Control Security MACSec protocol, a MACSec channel to a first network device. The receiver 730 is configured to receive, by the second network device by using the MACSec channel, a MACSec frame sent by the first network device. The processor 710 is further configured to determine, by the second network device according to identification information that is carried in a frame header of the MACSec frame and that is used to identify an autonomic control plane ACP packet, the ACP packet.

Therefore, by means of the second network device for packet transmission in this embodiment of the application, the MACSec channel is set up between the second network device and the first network device according to the MACSec protocol. The second network device receives, by using the MACSec channel, the MACSec frame sent by the first network device, and determines the ACP packet according to the identification information in the MACSec frame. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network by using the MACSec channel.

It should be understood that in this embodiment of the application, the processor 710 may be a central processing unit (CPU), or the processor 710 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 720 may include a read-only memory and a random access memory, and provides an instruction and data to the processor 710. A part of the memory 720 may further include a non-volatile random access memory. For example, the memory 720 may further store device type information.

The bus system 740 may further include a power bus, a control bus, a status signal bus, and the like in addition to a data bus. However, for clear description, various types of buses in the figure are all marked as the bus system 740.

In an implementation process, steps of the foregoing method may be implemented by a hardware integrated logic circuit in the processor 710 or by an instruction in a software form. Steps of the method disclosed with reference to the embodiments of the application may be directly embodied as being performed by a hardware processor or by a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 720, and the processor 710 reads information in the memory 720 and completes the steps in the foregoing method in combination with hardware of the processor. To avoid repetition, detailed description is not provided herein.

Optionally, in an embodiment, the identification information is carried in an Ethernet type field in the frame header of the MACSec frame, and the Ethernet type field is used to indicate that the MACSec frame is used to carry the ACP packet.

Optionally, in an embodiment, the identification information is carried in a flag bit field in the frame header of the MACSec frame, and the flag bit field is a newly added field or a version field.

Optionally, in an embodiment, the identification information is carried in a MAC address field in the frame header of the MACSec frame.

It should be understood that the second network device 700 for packet transmission in this embodiment of the application may correspond to the second network device 400 for packet transmission in the embodiments of the application, and may correspond to a corresponding entity for performing the method 200 in the embodiments of the application. The foregoing and other operations and/or functions of the modules of the second network device 700 are respectively intended to implement the corresponding procedures in each method in FIG. 5. For brevity, details are not described herein again.

Therefore, by means of the second network device for packet transmission in this embodiment of the application, the MACSec channel is set up between the second network device and the first network device according to the MACSec protocol. The second network device receives, by using the MACSec channel, the MACSec frame sent by the first network device, and determines the ACP packet according to the identification information in the MACSec frame. Therefore, a routable interface address and a link-local address that is used to set up an IPSec do not need to be both configured on an interface, and a MACSec security mechanism is provided for transmission of the ACP packet without using an L3 tunnel, thereby improving efficiency. In addition, the ACP packet can be distinguished from another packet by using the identification information in the frame header of the MACSec frame, so that the ACP packet can be transmitted between the first network device and the second network device that are in the self-organizing network by using the MACSec channel.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the application essentially, or the part contributing to the prior art, or some of the technical solutions may be implemented in the form of a software product. The software product is stored in a storage medium, and includes several instructions for instructing a computer device (which may be a personal computer, a server, or a network device) to perform all or some of the steps of the methods described in the embodiments of the application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the application, but are not intended to limit the protection scope of the application. Any variation or replacement readily figured out by a person skilled in the art within the technical scope disclosed in the application shall fall within the protection scope of the application. Therefore, the protection scope of the application shall be subject to the protection scope of the claims.

What is claimed is:

1. A packet transmission method applied to a self-organizing network, the method comprising:
setting up, by a first network device according to a Media Access Control Security (MACSec) protocol, a MACSec channel to a second network device; and
sending, by the first network device, a MACSec frame, to the second network device by using the MACSec channel, wherein the MACSec frame comprises an autonomic control plane (ACP) packet,
wherein the MACSec frame comprises a frame header containing identification information and the identification information is configured to indicate that the MACSec frame carries an ACP packet,
wherein the identification information is carried in an Ethernet type field in the frame header of the MACSec frame; or
wherein the identification information is carried in a flag bit field in the frame header of the MACSec frame; or
wherein the identification information is carried in a MAC address field in the frame header of the MACSec frame.

2. The method according to claim 1, wherein the flag bit field is an additional field or a version field.

3. A first network device for packet transmission applied to a self-organizing network, the first network device comprising:
a memory comprising instructions; and
one or more processors coupled to the memory and configured to execute the instructions to:
set up, according to a Media Access Control Security (MACSec) protocol, a MACSec channel to a second network device; and
send a MACSec frame to the second network device by using the MACSec channel, wherein the MACSec frame comprises an autonomic control plane (ACP) packet,
wherein the MACSec frame comprises a frame header containing identification information and the identification information is configured to indicate that the MACSec frame carries an ACP packet,
wherein the identification information is carried in an Ethernet type field in the frame header of the MACSec frame; or
wherein the identification information is carried in a flag bit field in the frame header of the MACSec frame; or
wherein the identification information is carried in a MAC address field in the frame header of the MACSec frame.

4. The first network device according to claim 3, wherein the flag bit field is an additional field or a version field.

5. A second network device for packet transmission applied to a self-organizing network, the second network device comprising:
a memory comprising instructions; and
one or more processors coupled to the memory and configured to execute the instructions to:
set up, according to a Media Access Control Security (MACSec) protocol, a MACSec channel to a first network device; and
receive, by using the MACSec channel, a MACSec frame, sent by the first network device, wherein the MACSec frame comprises an autonomic control plane (ACP) packet,
wherein the MACSec frame comprises a frame header containing identification information and the identification information is configured to indicate that the MACSec frame carries an ACP packet,
wherein the identification information is carried in an Ethernet type field in the frame header of the MACSec frame; or
wherein the identification information is carried in a flag bit field in the frame header of the MACSec frame; or
wherein the identification information is carried in a MAC address field in the frame header of the MACSec frame.

6. The second network device according to claim 5, wherein the flag bit field is an additional field or a version field.

7. The second network device according to claim 5, wherein the one or more processors configured to execute the instructions to:

determine, according to the identification information, the ACP packet.

8. A packet transmission system applied to a self-organizing network, comprising:
a first network device; and
a second network device, wherein
the first network device sets up, according to a Media Access Control Security (MACSec) protocol, a MACSec channel to the second network device;
the first network device sends a MACSec frame to the second network device by using the MACSec channel, wherein the MACSec frame comprises an autonomic control plane (ACP) packet, wherein the MACSec frame comprises a frame header containing identification information and the identification information is configured to indicate that the MACSec frame carries an ACP packet,
wherein the identification information is carried in an Ethernet type field in the frame header of the MACSec frame; or
wherein the identification information is carried in a flag bit field in the frame header of the MACSec frame; or
wherein the identification information is carried in a MAC address field in the frame header of the MACSec frame; and
the second network device receives the MACSec frame.

9. The packet transmission system according to claim 8, wherein the second network device determines, according to the identification information, the ACP packet.

\* \* \* \* \*